United States Patent
Altintas et al.

(10) Patent No.: US 10,334,405 B2
(45) Date of Patent: Jun. 25, 2019

(54) IDENTIFYING A GEOGRAPHIC LOCATION FOR A STATIONARY MICRO-VEHICULAR CLOUD

(71) Applicant: TOYOTA JIDOSHA KABUSHIKI KAISHA, Toyota-shi, Aichi-ken (JP)

(72) Inventors: Onur Altintas, Mountain View, CA (US); Takamasa Higuchi, Minato-ku (JP); Falko Dressler, Mountain View, CA (US)

(*) Notice: Subject to any disclaimer, the term of this patent is extended or adjusted under 35 U.S.C. 154(b) by 0 days.

(21) Appl. No.: 15/799,963

(22) Filed: Oct. 31, 2017

(65) Prior Publication Data

US 2019/0132706 A1    May 2, 2019

(51) Int. Cl.
*H04W 4/00* (2018.01)
*H04W 4/04* (2009.01)
*G06F 16/29* (2019.01)
*H04L 29/08* (2006.01)

(52) U.S. Cl.
CPC ............ *H04W 4/046* (2013.01); *G06F 16/29* (2019.01); *H04L 67/10* (2013.01); *H04L 67/12* (2013.01)

(58) Field of Classification Search
CPC ..... H04W 4/046; H04W 24/08; H04W 24/10; H04W 4/02; H04W 4/021; H04W 4/029; H04W 4/06; H04W 4/40; H04W 4/44; H04W 4/50; H04L 67/10; H04L 67/12; H04L 29/08
USPC .......................................... 455/456.1–456.5
See application file for complete search history.

(56) References Cited

U.S. PATENT DOCUMENTS

| | | | | |
|---|---|---|---|---|
| 8,032,081 B2* | 10/2011 | Bai | ...................... | H04L 12/1818 455/11.1 |
| 9,365,188 B1* | 6/2016 | Penilla | ................ | B60R 25/2018 |
| 2010/0227626 A1* | 9/2010 | Dressler | ................ | G01S 5/0252 455/456.1 |
| 2015/0210287 A1* | 7/2015 | Penilla | ................... | B60W 40/08 701/49 |
| 2016/0212596 A1* | 7/2016 | Brahmi | .................... | H04L 67/12 |
| 2017/0197617 A1* | 7/2017 | Penilla | .................. | B60W 30/09 |
| 2017/0270490 A1* | 9/2017 | Penilla | ................ | G06Q 10/1095 |
| 2017/0331670 A1* | 11/2017 | Parkvall | ............... | H04J 11/0079 |
| 2018/0035320 A1* | 2/2018 | Drazynski | ............. | H04W 24/08 |
| 2018/0124650 A1* | 5/2018 | Park | .................. | H04W 36/0016 |

FOREIGN PATENT DOCUMENTS

| | | | | |
|---|---|---|---|---|
| WO | WO 2015032436 A1 * | 3/2015 | ............. | H04L 67/12 |
| WO | WO 2017016889 A1 * | 2/2017 | .......... | H04W 56/001 |
| WO | WO 2017171923 A1 * | 10/2017 | ............. | H04W 4/001 |
| WO | WO 2017180049 A1 * | 10/2017 | .............. | H04W 4/70 |

* cited by examiner

*Primary Examiner* — Nathan S Taylor
(74) *Attorney, Agent, or Firm* — Burbage Law, P.C.; Jon-Michael Burbage; Elizabeth Ruzich

(57) ABSTRACT

The disclosure includes embodiments for identifying a geographic location for a stationary micro-vehicular cloud. In some embodiments, a method includes receiving, by an onboard unit of a connected vehicle, a wireless beacon including a unique identifier of an infrastructure element which broadcasted the wireless beacon. The method includes identifying, based on the unique identifier, a geographic location for a stationary micro-vehicular cloud. In this way the geographic location of the stationary micro-vehicular cloud is identified without the use of global positioning system ("GPS") data.

20 Claims, 7 Drawing Sheets

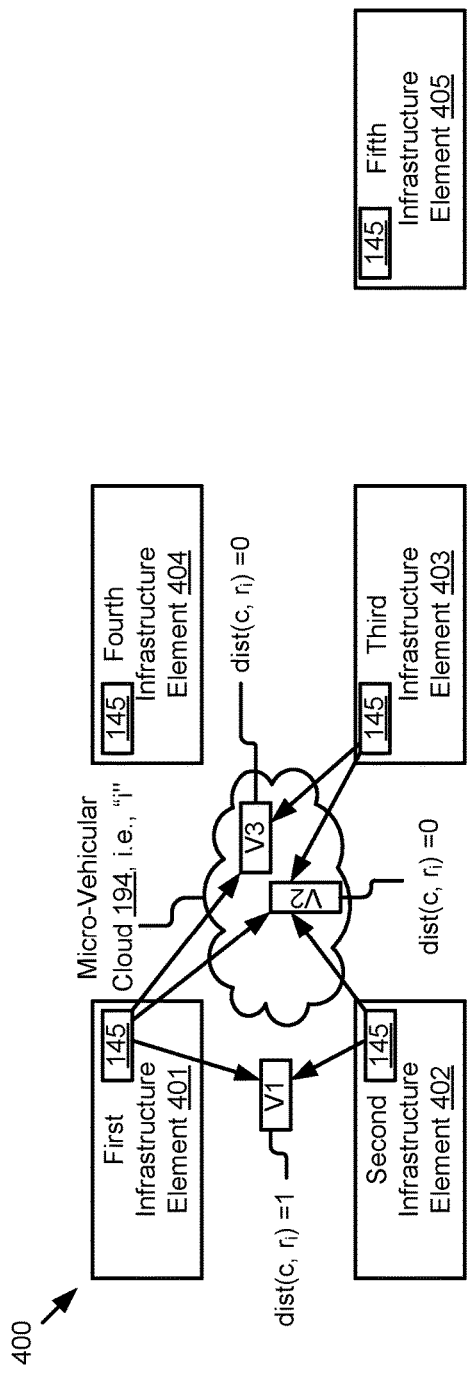
Figure 4A
Figure 4C
Figure 4B

BSM DATA 595

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 5A

BSM DATA 595

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 5B

IDENTIFYING A GEOGRAPHIC LOCATION FOR A STATIONARY MICRO-VEHICULAR CLOUD

BACKGROUND

The specification relates to identifying a geographic location for a stationary micro-vehicular cloud.

Connected vehicles form clusters of interconnected vehicles (e.g., via vehicle-to-everything, i.e., "V2X") that are located at a similar geographic location. Such clusters are known as "micro-vehicular clouds" or "stationary micro-vehicular clouds." The vehicles in the cluster make available their unused computing resources to the other members of the micro-vehicular cloud.

SUMMARY

Stationary micro-vehicular clouds are desirable because they allow connected vehicles to access free network services in geographic locations where roadside units are not located. It is difficult to form stationary micro-vehicular clouds in urban environments because existing methods for forming micro-vehicular clouds rely on the ability of vehicles to retrieve GPS coordinates, and GPS coordinates are hard to retrieve in urban canyons where buildings block GPS satellite signals. Existing solutions for forming stationary micro-vehicular clouds also rely on parked cars to participate in such micro-vehicular clouds and lend their computing resources to the micro-vehicular clouds, but this is not realistic because these vehicles will be powered off and therefore unable to join the micro-vehicular cloud. Existing solutions also rely on the frequent exchange of control messages among members to a degree that is likely too much overhead for real-world deployment. Described herein is a fingerprint system which overcomes the limitations of the existing solutions by providing a way of locating and forming stationary micro-vehicular clouds in urban areas without relying on GPS coordinates, parked cars or control messages.

In some embodiments, the fingerprint system includes code and routines that are operable, when executed by the processor of the connected vehicle, to cause the processor to identify or form stationary micro-vehicular clouds in urban environments using wireless beacons that are transmitted by one or more network-enabled infrastructure elements (e.g., open Wi-Fi™ access points). The connected vehicle may be in motion, waiting in a queue or parked (e.g., because even parked vehicles collect wireless beacons).

The description of the fingerprint system provided herein focuses on urban environments, but would work well in some rural environments having sufficient open Wi-Fi access points.

In some embodiments, the fingerprint system is operable, when executed by the processor of the connected vehicle, to cause the processor to collect the wireless beacons during a predetermined time frame. See, e.g., FIG. 4A. The fingerprint system includes code and routines that are operable, when executed by the processor of the connected vehicle, to cause the processor to generate local fingerprint data. The local fingerprint data is digital data that describes a local fingerprint. The local fingerprint describes the infrastructure elements encountered by the connected vehicle during the predetermined time frame based on the wireless beacons it has received during the time frame. In some embodiments, the local fingerprint is expressed as a vector. See, e.g., FIG. 4B.

A server stores a reference fingerprint data. Reference fingerprint data is digital data that describes a reference fingerprint. The reference fingerprint describes the infrastructure elements which are present at a geographic location where a stationary micro-vehicular cloud is presently located or should be formed. In some embodiments, the reference fingerprint is expressed as a vector. See, e.g., FIG. 4C.

In some embodiments, the fingerprint system includes code and routines that are operable, when executed by the processor of the connected vehicle, to cause the processor to wirelessly communicate with the server via a network to either (1) retrieve the reference fingerprint from the server via a wireless network or (2) transmit the local fingerprint data to the server via the wireless network so that the server can compare the reference fingerprint to the local fingerprint as described herein.

The server includes a directory client. In some embodiments, the directory client includes code and routines that are operable, when executed by a processor of the server, to cause the processor to generate and maintain the reference fingerprint.

In some embodiments, the directory client includes code and routines that are operable, when executed by a processor of the server, to cause the processor to transmit the reference fingerprint to the fingerprint system of the connected vehicle via the wireless network. The fingerprint system of the connected vehicle receives the reference fingerprint from the wireless network. The fingerprint system includes code and routines that are operable, when executed by the processor of the connected vehicle, to cause the processor to compare the local fingerprint to the reference fingerprint and determine, based on this comparison, whether the connected vehicle is currently located at a location for a stationary micro-vehicular cloud (it may be currently formed, or in need of forming).

In some embodiments, the local fingerprint is expressed as a vector, and the reference fingerprint is also expressed as a vector. The fingerprint system includes code and routines that are operable, when executed by the processor of the connected vehicle, to cause the processor to compare the local fingerprint and the reference fingerprint by determining the distance between these two vectors. If the distance is below a threshold, then this indicates that the connected vehicle is currently located at a location for a stationary micro-vehicular cloud (it may be currently formed, or in need of forming). The fingerprint system causes the connected vehicle to join, form or leave the stationary micro-vehicular cloud with other nearby vehicles and one or more of the infrastructure elements which transmitted the wireless beacons.

A DSRC-equipped device is any processor-based computing device that includes a DSRC transmitter and a DSRC receiver. For example, if a connected vehicle includes a DSRC transmitter and a DSRC receiver, then the connected vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, the connected vehicle described above is a DSRC-equipped vehicle. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter, and is operable to wirelessly send and receive DSRC messages on a band that is reserved for DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a Wi-Fi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a processor of a connected vehicle communicatively coupled to a communication unit, where the processor is operable to execute computer code that causes the processor to: receive, via the communication unit, a wireless beacon including a unique identifier of an infrastructure element which broadcasted the wireless beacon; and identify, based on the unique identifier, a geographic location for a stationary micro-vehicular cloud. Other embodiments of this aspect include corresponding computer systems, apparatus, and computer programs recorded on one or more computer storage devices, each configured to perform the actions of the methods.

Implementations may include one or more of the following features. The system where the infrastructure element is an open Wi-Fi access point. The system where the infrastructure element is included in a server. The system where the server is included in a roadside unit. The system further including additional computer code which is operable to cause the processor to: generate a local fingerprint that describes the unique identifier of the infrastructure element; compare the local fingerprint to a reference fingerprint; and participate in the stationary micro-vehicular cloud based on the comparison. The system where participating in the stationary micro-vehicular cloud includes one or more of: forming the stationary micro-vehicular cloud; joining the stationary micro-vehicular cloud; and leaving the stationary micro-vehicular cloud. The system where the comparison indicates that the connected vehicle is positioned at a geographic location for the stationary micro-vehicular cloud. The system where the reference fingerprint describes one or more unique identifiers of one or more infrastructure elements which are known to be located at the geographic location for the stationary micro-vehicular cloud. Implementations of the described techniques may include hardware, a method or process, or computer software on a computer-accessible medium.

One general aspect includes a method including: receiving, by an onboard unit of a connected vehicle, a wireless beacon including a unique identifier of an infrastructure element which broadcasted the wireless beacon; and identifying, based on the unique identifier, a geographic location for a stationary micro-vehicular cloud. Other embodiments of this aspect include corresponding computer systems, apparatus, and computer programs recorded on one or more computer storage devices, each configured to perform the actions of the methods.

Implementations may include one or more of the following features. The method where the infrastructure element is an open Wi-Fi access point. In some embodiments, an open Wi-Fi access point is referred to herein as a wireless access point. The method where the infrastructure element is included in a server. The method where the server is included in a roadside unit. The method further including: generating a local fingerprint that describes the unique identifier of the infrastructure element; comparing the local fingerprint to a reference fingerprint; and participating in the stationary micro-vehicular cloud based on the comparison.

The method where participating in the stationary micro-vehicular cloud includes one or more of: forming the stationary micro-vehicular cloud; joining the stationary micro-vehicular cloud; and leaving the stationary micro-vehicular cloud. The method where the comparison indicates that the connected vehicle is positioned at the geographic location for the stationary micro-vehicular cloud. The method where the reference fingerprint describes one or more unique identifiers of one or more infrastructure elements which are known to be located at the geographic location for the stationary micro-vehicular cloud. Implementations of the described techniques may include hardware, a method or process, or computer software on a computer-accessible medium.

One general aspect includes a computer program product of a connected vehicle including a non-transitory memory storing computer-executable code that, when executed by a processor of the connected vehicle, causes the processor to: receive a wireless beacon including a unique identifier of an infrastructure element which broadcasted the wireless beacon; and identify, based on the unique identifier, a geographic location for a stationary micro-vehicular cloud. Other embodiments of this aspect include corresponding computer systems, apparatus, and computer programs recorded on one or more computer storage devices, each configured to perform the actions of the methods.

Implementations may include one or more of the following features. The computer program product further including additional computer-executable code that, when executed by the processor, causes the processor to: generate a local fingerprint that describes the unique identifier of the infrastructure element; compare the local fingerprint to a reference fingerprint; and participate in the stationary micro-vehicular cloud based on the comparison. The computer program product where the comparison indicates that the connected vehicle is positioned at the geographic location for the stationary micro-vehicular cloud. The computer program product where the reference fingerprint describes one or more unique identifiers of one or more infrastructure elements which are known to be located at the geographic location for the stationary micro-vehicular cloud. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A is a block diagram illustrating an operating environment for a fingerprint system according to some embodiments.

FIG. 4B is a block diagram illustrating local fingerprint data according to some embodiments.

FIG. 4C is a block diagram illustrating reference fingerprint data according to some embodiments.

FIGS. 5A and 5B are block diagrams illustrating Basic Safety Message ("BSM") data according to some embodiments.

DETAILED DESCRIPTION

Figure 1A:
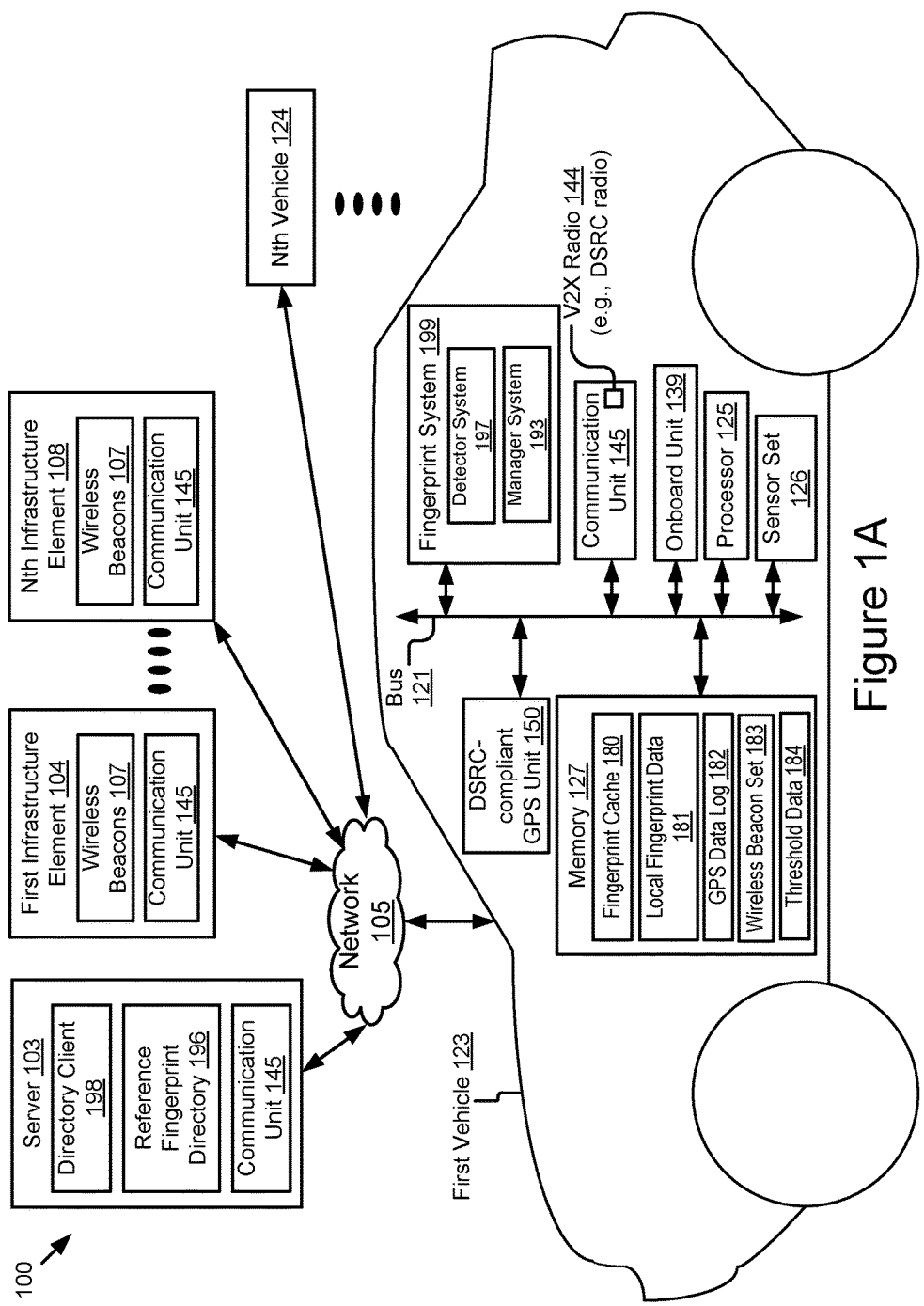
FIG. 1A is a block diagram illustrating an operating environment for a fingerprint system according to some embodiments.

Referring now to FIG. 1A, depicted is a block diagram illustrating an operating environment 100 for a fingerprint system 199 according to some embodiments. The operating environment 100 may include one or more of the following elements: a first vehicle 123; an Nth vehicle 124 (where "N" represents any positive whole number); a first infrastructure element 104; an Nth infrastructure element 108; and a server 103. These elements of the operating environment 100 may be communicatively coupled to one another via a network 105. These elements of the operating environment 100 are depicted by way of illustration. In practice, the operating environment 100 may include one or more of first vehicles 123, one or more Nth vehicles 124, one or more first infrastructure elements 104, one or more Nth infrastructure elements 108, one or more servers 103 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the first vehicle 123 is a DSRC-equipped vehicle and the server 103 is a DSRC-equipped device. For example, the first vehicle 123 includes a DSRC-compliant GPS unit 150 and a DSRC radio (e.g., the V2X radio 144 is a DSRC radio in embodiments where the first vehicle 123 is a DSRC-equipped vehicle) and the server 103 includes a communication unit 145 having a DSRC radio similar to the one included in the first vehicle 123. The network 105 may include a DSRC communication channel shared among the first vehicle 123 and a second vehicle.

The first vehicle 123 may include a car, a truck, a sports utility vehicle, a bus, a semi-truck, a drone or any other roadway-based conveyance. In some embodiments, the first vehicle 123 may include an autonomous vehicle or a semi-autonomous vehicle.

In some embodiments, the first vehicle 123 is a connected vehicle. For example, the first vehicle 123 is communicatively coupled to the network 105 and can send and receive messages via the network 105, and this quality may make the first vehicle 123 a "connected vehicle."

The first vehicle 123 includes one or more of the following elements: a processor 125; a sensor set 126; a DSRC-compliant GPS unit 150; a communication unit 145; an onboard unit 139; a memory 127; and a fingerprint system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A depicts a single processor 125 present in the first vehicle 123, multiple processors may be included in the first vehicle 123. The processor 125 may include a graphical processing unit. Other processors, operating systems, sensors, displays, and physical configurations may be possible.

In some embodiments, the processor 125 may be an element of a processor-based computing device of the first vehicle 123. For example, the first vehicle 123 includes one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the fingerprint system 199. In some embodiments, the onboard unit 139 is the computer system 200 depicted in FIG. 2.

The sensor set 126 includes one or more onboard vehicular sensors. The sensor set 126 collects wireless beacons 107 from the network 105 and stores the wireless beacons 107 in the memory to form the wireless beacon set 183. The sensor set 126 includes one or more network sniffers or any other hardware device which is operable to receive wireless the wireless beacons 107 from the network 105.

In some embodiments, the sensor set 126 may include one or more sensors that are operable to measure the physical environment outside of the first vehicle 123. For example, the sensor set 126 may record one or more physical characteristics of the physical environment that is proximate to the first vehicle 123.

In some embodiments, the sensor set 126 may include one or more sensors that are operable to measure the physical environment inside a cabin of the first vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes one or more locations of a device (e.g., one or more of the first vehicle 123, the Nth vehicle 124 of the server 103) at one or more different times, images or other measurements of the roadway environment and objects or other vehicles present in the roadway environment such as pedestrians, animals, traffic signs, traffic lights, pot holes, etc.

A roadway environment may include a roadway region that is proximate to the first vehicle 123. For example, the first vehicle 123 may be in motion on a roadway and the roadway environment may include one or more vehicles that are in front of the first vehicle 123, behind the first vehicle 123, beside the first vehicle 123 or one or more car lengths away from the first vehicle 123. The sensor data may describe measurable aspects of the roadway environment.

In some embodiments, the sensor data may describe an event present in the roadway environment. The event may be any roadway condition that causes roadway congestion, is an indication of roadway congestion or is a result of roadway congestion. The event may also include an opening between two objects of the roadway environment which is big enough for a vehicle (e.g., the first vehicle 123) to enter or pass through without causing a collision or nearly causing a collision.

In some embodiments, the DSRC-compliant GPS unit 150 includes any hardware and software necessary to make the first vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the first vehicle 123 with lane-level accuracy. For example, the first vehicle 123 is traveling in a lane of a multi-lane roadway. Lane-level accuracy means that the lane of the first vehicle 123 is described by the GPS data so accurately that the first vehicle's 123 precise lane of travel may be accurately determined based on the GPS data for this first vehicle 123 as provided by the DSRC-compliant GPS unit 150.

In some embodiments, the DSRC-compliant GPS unit 150 includes hardware that wirelessly communicates with a GPS satellite (or GPS server) to retrieve GPS data that describes the geographic location of the first vehicle 123 with a precision that is compliant with the DSRC standard. The DSRC standard requires that GPS data be precise enough to infer if two vehicles (one of which is, for example, the first vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the fingerprint system 199 described herein may analyze the GPS data provided by the DSRC-compliant GPS unit 150 and determine what lane the first vehicle 123 is traveling in based on the relative positions of two or more different vehicles (one of which is, for example, the first vehicle 123) traveling on a roadway at the same time.

By comparison to the DSRC-compliant GPS unit 150, a conventional GPS unit which is not compliant with the DSRC standard is unable to determine the location of a vehicle 123 with lane-level accuracy. For example, a typical parking space is approximately 3 meters wide. However, a conventional GPS unit only has an accuracy of plus or minus 10 meters relative to the actual location of the first vehicle 123. As a result, such conventional GPS units are not sufficiently accurate enable the fingerprint system 199 to determine the lane of travel of the first vehicle 123.

The GPS data log 182 is digital data that includes a log of the GPS locations of the first vehicle 123 at two or more different times. For example, the GPS data log 182 includes a plurality of instances of GPS data retrieved by the DSRC-compliant GPS unit 150 and the times when these instances of GPS data were retrieved. For example, each instance of GPS data includes a time value describing when the first vehicle 123 was at a particular geographic location.

The communication unit 145 transmits and receives data to and from a network 105 or to another communication channel (e.g., the V2X network 106 depicted in FIG. 1C). In some embodiments, the communication unit 145 may include a DSRC transmitter, a DSRC receiver and other hardware or software necessary to make the first vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Messages ("BSM message" if singular, "BSM messages" if plural). In some embodiments, the non-transitory memory stores a buffered version of the GPS data for the first vehicle 123 so that the GPS data for the first vehicle 123 is broadcast as an element of the BSM messages which are regularly broadcast by the V2X radio 144 (e.g., at an interval of once every 0.10 seconds). An example of the digital data that is included in a BSM message is depicted in FIGS. 5A and 5B.

In some embodiments, the V2X radio 144 includes any hardware or software which is necessary to make the first vehicle 123 compliant with the DSRC standards. In some embodiments, the DSRC-compliant GPS unit 150 is an element of the V2X radio 144.

The memory 127 is a non-transitory storage medium. The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the data described below with reference to FIGS. 1B, 2, 3, 4A-4C, 5A and 5B.

As depicted in FIG. 1A, the memory 127 stores the following digital data: a fingerprint cache 180; local fingerprint data 181; the GPS data log 182; a wireless beacon set 183 and threshold data 184.

The GPS data log 182 was described above with reference to the DSRC-compliant GPS unit 150, and so, that description will not be repeated here.

The wireless beacon set 183 is digital data that describes one or more wireless beacons 107 that are received by the sensor set 126 or the communication unit 145 of the first vehicle 123. For example, the sensor set 126 or the communication unit 145 of the first vehicle 123 collect wireless beacons 107 during a predetermined time frame and the wireless beacon set 183 includes the wireless beacons 107 collected during this predetermined time frame.

The wireless beacons 107 included in the wireless beacon set 183 were originally broadcast by one or more infrastructure elements such as the first infrastructure element 104 and the Nth infrastructure element 108. Each wireless beacon includes a permanent unique identifier, such as a media access control address (MAC address), of the infrastructure element which originally broadcast that wireless beacon. For example, the first infrastructure element 104 is an open Wi-Fi access point that is located at a fixed geographic location. The first infrastructure element 104 broadcasts one or more wireless beacons 107. Each of the one or more wireless beacons 107 broadcast by the first infrastructure element 104 includes a MAC address for the first infrastructure element 104. The communication unit 145 or the sensor set 126 of the first vehicle 123 receive the one or more wireless beacons 107 broadcast by the first infrastructure element 104, and so, the first vehicle 123 is said to have "encountered" the first infrastructure element 104 during the predetermined time frame. The one or more wireless beacons 107 are stored by the communication unit 145, sensor set 126 or fingerprint system 199 in memory 127 as elements of the wireless beacon set 183.

In some embodiments, the directory client 198 of the server 103 provides the first vehicle 123 with reference fingerprint data. The reference fingerprint data is digital data that describes one or more reference fingerprints. A reference fingerprint describes the infrastructure elements which are present at a geographic location where a stationary micro-vehicular cloud is presently located or should be formed. In some embodiments, the reference fingerprint is expressed as a vector. The fingerprint cache 180 is a data structure (or a portion of the memory 127) that stores the reference fingerprint data. An example of the reference fingerprint data is depicted below with reference to FIG. 4C.

The local fingerprint data 181 is digital data that describes a local fingerprint. The local fingerprint describes the infrastructure elements encountered by the first vehicle 123 during the predetermined time frame based on the wireless beacons 107 it has received during the predetermined time frame. In some embodiments, the local fingerprint is expressed as a vector. See, e.g., FIG. 4B.

The fingerprint system 199 compares the local fingerprint for the most recent predetermined time frame to one or more instances of reference fingerprints stored in the fingerprint cache 180 to determine if the first vehicle 123 is presently at a geographic location where a stationary micro-vehicular cloud is currently formed or in need of forming. If the local fingerprint for the most recent predetermined time frame is within a threshold of similarity of at least one of the reference fingerprints, then this indicates that the first vehicle 123 is presently at a geographic location where a stationary micro-vehicular cloud is currently formed or in need of forming. The fingerprint system 199 causes the first vehicle 123 to join, form or leave the stationary micro-vehicular cloud based on the comparison. The threshold data 184 is digital data that describes the threshold used for the comparison of the local fingerprint for the most recent predetermined time frame to the one or more instances of reference fingerprints stored in the fingerprint cache 180.

In some embodiments, the local fingerprint for the most recent predetermined time frame to one or more instances of reference fingerprints stored in the fingerprint cache 180 are each vectors as depicted in FIGS. 4A-4C. In these embodiments, the fingerprint system 199 calculates a distance from the local fingerprint and the one or more reference fingerprints, and then determines if this distance is within a threshold described by the threshold data 184. If the distance is within the threshold, then this indicates that the first vehicle 123 is presently at a geographic location where a stationary micro-vehicular cloud is currently formed or in need of forming.

The fingerprint system 199 includes code and routines that are operable, when executed by the processor 125, to cause the processor 125 to execute one or more of the steps of the method 300 described below with reference to FIG. 3.

In some embodiments, the fingerprint system 199 is an element of the onboard unit 139 or some other onboard vehicle computer. The fingerprint system 199 includes a detector system 197 and a manager system 193. These elements of the fingerprint system 199 are now described.

The detector system 197 includes code and routines that are operable, when executed by a processor of the first vehicle 123 (e.g., the processor 125) or an onboard vehicle computer, to cause the processor or the onboard vehicle computer to execute a fingerprint analysis including one or more of the following steps: (1) receive wireless beacons 107 from the infrastructure elements 104, 108 during a predetermined period of time; (2) store the wireless beacons 107 in the memory 127 as elements of the wireless beacon set 183; (3) generate a local fingerprint that describes, based on the permanent unique identifiers included in the wireless beacons, which infrastructure elements 104, 108 have broadcast wireless beacons within the current predetermined period of time; (4) store local fingerprint data 181 that describes the local fingerprint generated in the previous step; (5) retrieve one or more reference fingerprints from the fingerprint cache 180; and (6) compares the one or more reference fingerprints to the local fingerprint to determine whether (i) to form or join a stationary vehicular micro-vehicular cloud at the current geographic location of the first vehicle 123 or (ii) to do nothing at all and restart the process at step (1). For step 6, in some embodiments the local fingerprint and the one or more reference fingerprints are vectors and comparing the fingerprints includes (i) determining a distance between the vectors and (ii) determining whether the distance is less than a threshold described by the threshold data 184. The fingerprint analysis described in this paragraph may also indicate whether the first vehicle should leave a particular stationary micro-vehicular cloud it has already joined or formed. In some embodiments, the threshold data 184 describes two thresholds: a threshold for leaving a stationary micro-vehicular cloud; and a threshold for joining or forming a stationary micro-vehicular cloud.

The manager system 193 includes code and routines that are operable, when executed by a processor of the first vehicle 123 (e.g., the processor 125) or an onboard vehicle computer, to cause the processor or the onboard vehicle computer to determine, based on the fingerprint analysis executed by the detector system 197, whether to form, join or leave a micro-vehicular cloud.

The Nth vehicle 124 includes elements and functionality similar to the first vehicle 123, and so, those descriptions will not be repeated here. Accordingly, the operating environment 100 may include N number of vehicles such as the first vehicle 123.

The first infrastructure element 104 is an open Wi-Fi access point that is located at a fixed geographic location. The first infrastructure element 104 includes a communication unit 145 that transmits one or more wireless beacons 107. The communication unit 145 of the first infrastructure element 104 includes elements and functionality that are similar to the communication unit 145 of the first vehicle 123, and so, those descriptions will not be repeated here. The communication unit 145 of the first infrastructure element 104 broadcasts the wireless beacons 107. The wireless beacons 107 of the first infrastructure element 104 were described above with reference to the first vehicle 123.

The Nth infrastructure element 108 includes elements and functionality similar to the first infrastructure element 104, and so, those descriptions will not be repeated here. Accordingly, the operating environment 100 may include N number of infrastructure elements such as the first infrastructure element 104.

The server 103 is a processor based computing device. For example, the computing device may include a stand-alone hardware server. In some embodiments, the server 103 may be communicatively coupled to the network 105. The server 103 includes network communication capabilities. The server 103 is operable to send and receive wireless messages via the network 105.

In some embodiments, the server 103 is a public server. In some embodiments, the server 103 is an element of a roadside unit or a cloud server. In some embodiments, the server 103 is an edge server.

As depicted, the server 103 includes the following elements: a directory client 198; a reference fingerprint directory 196; and a communication unit 145.

Although not depicted in FIG. 1A, the server includes a processor similar to the processor 125 described above with reference to the first vehicle 123.

The reference fingerprint directory 196 is a data structure that includes fingerprint data describing a plurality of reference fingerprints.

The directory client 198 includes code and routines that are operable, when executed by the processor of the server 103, to cause the processor of the server 103 to execute one or more of the following steps: generate reference fingerprints; maintains the reference fingerprint directory 196; and provide reference fingerprint data describing one or more reference fingerprints to vehicles that request them (e.g., the first vehicle 123, the Nth vehicle 124, etc.).

In some embodiments, the directory client 198 includes code and routines that are operable, when executed by the processor of the server 103, to cause the processor of the server 103 to generate a graphical user interface that is used by a human operator (e.g., a public official) to input data to the directory client 198 describing the reference fingerprints. In this way, the reference fingerprint directory 196 is populated in some embodiments.

The communication unit 145 of the server 103 includes elements and functionality that are similar to the communication unit 145 of the first vehicle 123, and so, those descriptions will not be repeated here. The communication unit 145 of the server 103 receives wireless messages from the network 105 including requests for fingerprint data and responds to those requests with fingerprint data from the reference fingerprint directory 196. In some embodiments, the fingerprint system 199 includes code and routines that are operable, when executed by the processor 125, to cause the processor to transmit a wireless message to the server 103 via the network 105 including request for the fingerprint data and receive a response including the fingerprint data which is then stored in the fingerprint cache 180.

In some embodiments, one or more of the first vehicle 123, the Nth vehicle 124, the first infrastructure element 104, the Nth infrastructure element 108 and the server 103 include a full-duplex coordination system as described in U.S. patent application Ser. No. 14/471,387 filed on Aug. 28, 2014 and entitled "Full-Duplex Coordination System." In this way, one or more of these elements of the operating environment 100 may transmit full-duplex wireless messages to one another. For example, any of the wireless messages described herein may be full-duplex wireless messages.

In some embodiments, one or more of the communication units 145 of the first vehicle 123, the Nth vehicle 124, the first infrastructure element 104, the Nth infrastructure element 108 and the server 103 include a mmWave communication transceiver and receiver. In this way, one or more of these elements of the operating environment 100 may transmit mmWave messages to one another. For example, any of the wireless messages described herein may be mmWave messages.

In some embodiments, the fingerprint system 199 is implemented using hardware including a field-programmable gate array ("FPGA") or an application-specific integrated circuit ("ASIC"). In some other embodiments, the fingerprint system 199 is implemented using a combination of hardware and software.

In some embodiments, the directory client 198 is implemented using hardware including an FPGA or an ASIC. In some other embodiments, the directory client 198 is implemented using a combination of hardware and software.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the fingerprint system 199 and the directory client 198 include encryption keys for encrypting wireless messages and decrypting the wireless messages described herein.

Figure 1B:
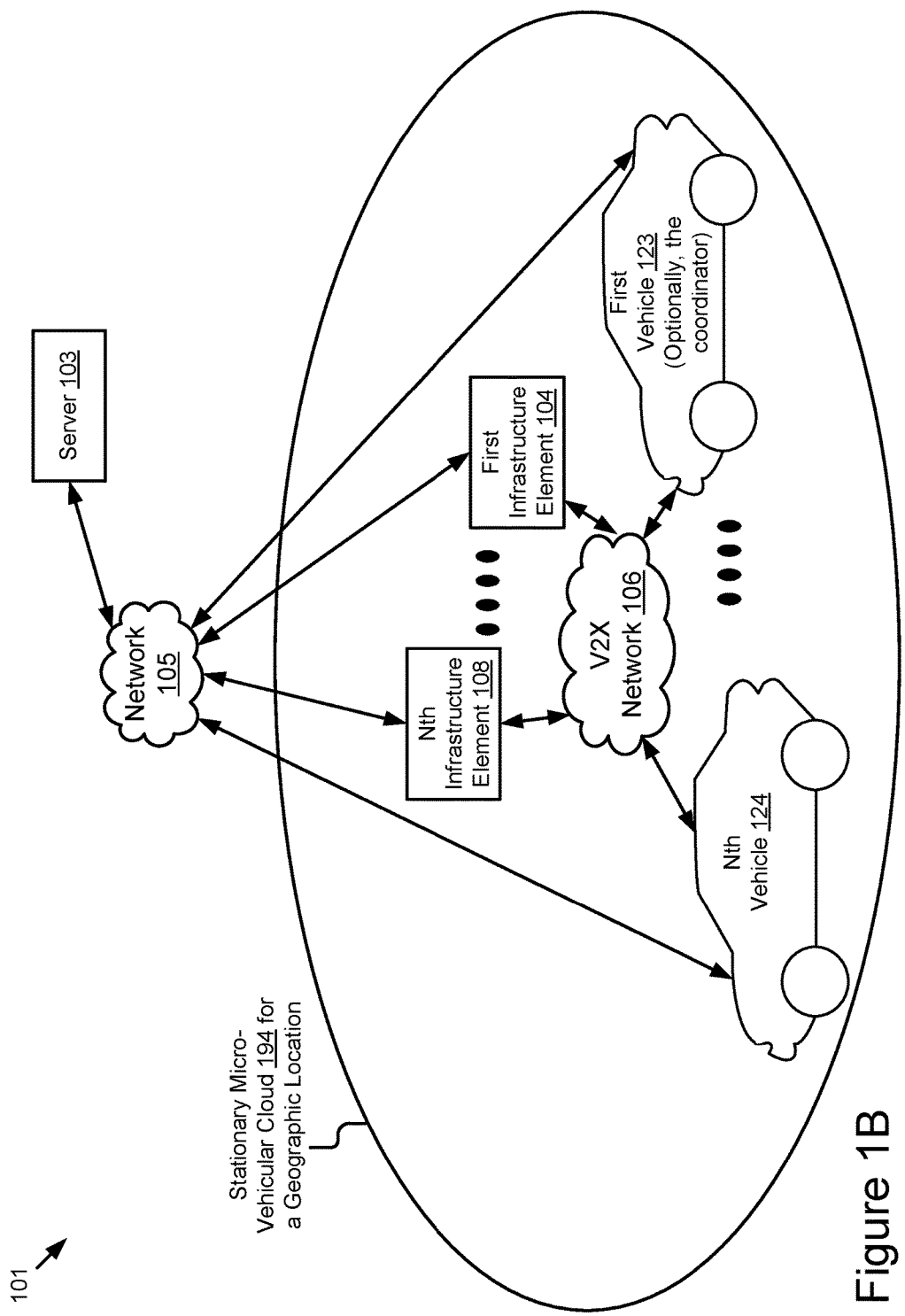
FIG. 1B is a block diagram illustrating micro-vehicular cloud according to some embodiments.

Referring now to FIG. 1B, depicted is a block diagram illustrating a stationary micro-vehicular cloud 194 according to some embodiments. As depicted, the stationary micro-vehicular cloud 194 includes: the first vehicle 123; the Nth vehicle 124; the first infrastructure element 104; the Nth infrastructure element 108; and a vehicle-to-everything network 106 (herein, a "V2X" network 106) which is exclusively usable by the endpoints which are members of the stationary micro-vehicular cloud 194.

In some embodiments, a member of the stationary micro-vehicular cloud 194 includes any endpoint (e.g., the first vehicle 123, the Nth vehicle 124, the server 103, etc.) which has completed a process to join the stationary micro-vehicular cloud 194 (e.g., a handshake process with the coordinator of the stationary micro-vehicular cloud 194).

In some embodiments, the V2X network 106 includes DSRC or any other suitable wireless network such as those described above with reference to the network 105.

In some embodiments, the stationary micro-vehicular cloud 194 include less elements than those depicted in FIG. 1B. For example, the stationary micro-vehicular cloud 194 may include less vehicles and less infrastructure elements than those depicted in FIG. 1B.

In some embodiments, a stationary micro-vehicular cloud 194 is a wireless network system in which a plurality of connected vehicles (such as the first vehicle 123 and the Nth vehicle 124), and optionally devices such as the server 103, form a cluster of interconnected vehicles that are located at a same geographic region. The connected vehicles are interconnected via Wi-Fi, mmWave, DSRC or some other form of V2X wireless communication. For example, the connected vehicles are interconnected via the V2X network 106. Vehicles (and devices such as the server 103) which are members of the same stationary micro-vehicular cloud 194 make their unused computing resources available to the other members of the stationary micro-vehicular cloud 194.

In some embodiments, the stationary micro-vehicular cloud 194 is "stationary" because the geographic location of the stationary micro-vehicular cloud 194 is static; different vehicles constantly enter and exit the stationary micro-vehicular cloud 194 over time. This means that the computing resources available within the stationary micro-vehicular cloud 194 is variable based on the traffic patterns for the geographic location at different times of day: increased traffic corresponds to increased computing resources because more vehicles will be eligible to join the stationary micro-vehicular cloud 194; and decreased traffic corresponds to decreased computing resources because less vehicles will be eligible to join the stationary micro-vehicular cloud 194.

In some embodiments, the V2X network 106 is a non-infrastructure network. A non-infrastructure network is any conventional wireless network that does not include infrastructure such as cellular towers, servers or server farms. For example, the V2X network 106 specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi network shared among two or more vehicles 123, 124

Figure 2:
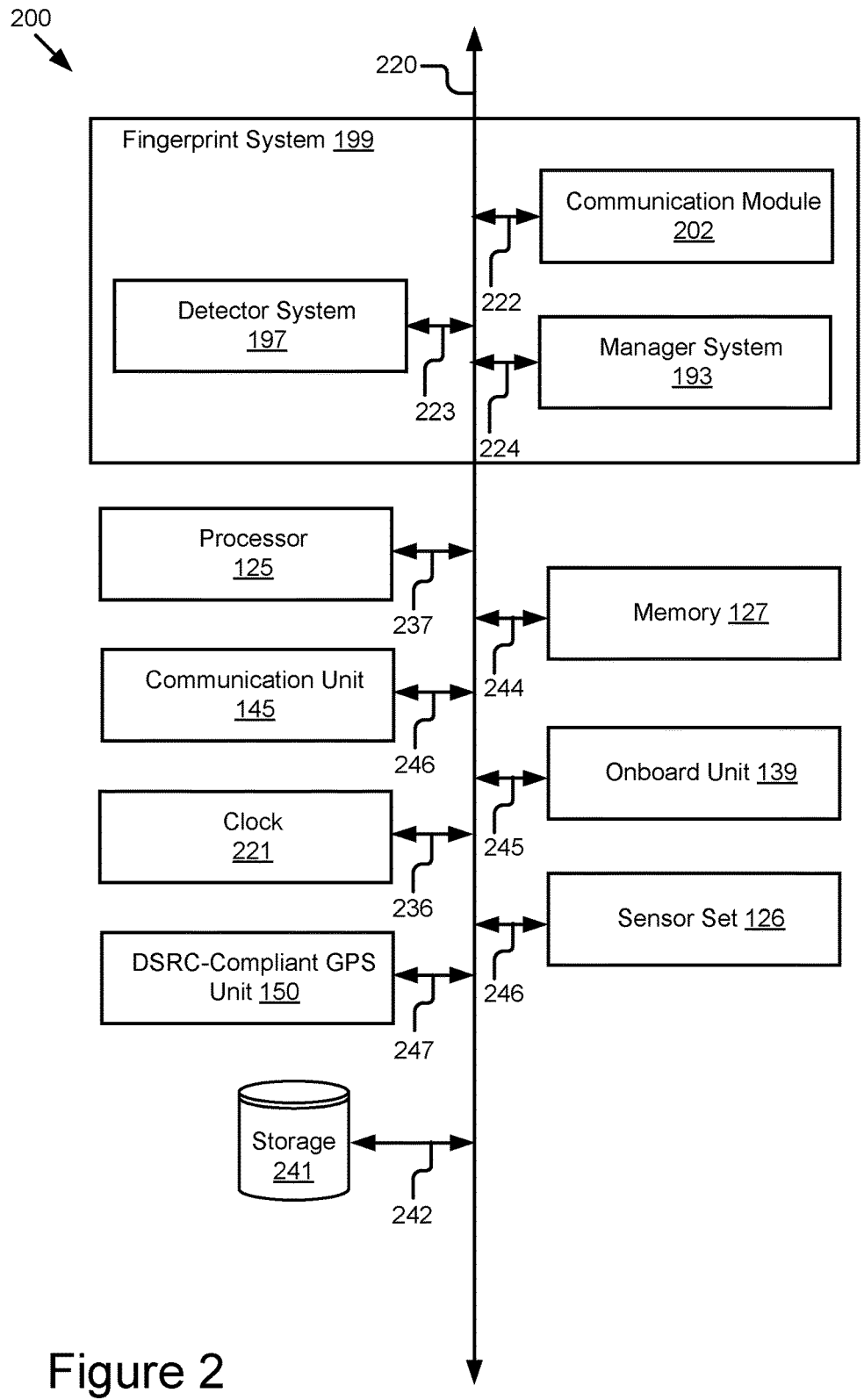
FIG. 2 is a block diagram illustrating an example computer system including a fingerprint system according to some embodiments.

Referring now to FIG. 2, depicted is a block diagram illustrating an example computer system 200 including a fingerprint system 199 according to some embodiments.

In some embodiments, the computer system 200 may include a special-purpose computer system that is programmed to perform one or more steps of the method 300 described below with reference to FIG. 3.

In some embodiments, the computer system 200 may include a processor-based computing device. For example, the computer system 200 may include an onboard vehicle computer system of the first vehicle 123 or the Nth vehicle 124; the computer system 200 may also include an onboard computer system of the server 103, the first infrastructure element 104 or the Nth infrastructure element 108.

The computer system 200 may include one or more of the following elements according to some examples: the fingerprint system 199; a processor 125; a communication unit 145; a clock 221; a DSRC-compliant GPS unit 150; a storage 241; a memory 127; and onboard unit 139; and a sensor set 126. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The clock 221 is communicatively coupled to the bus 220 via a signal line 236. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244. The onboard unit 139 is communicatively coupled to the bus 220 via a signal line 245. The sensor set 126 is communicatively coupled to the bus 220 via a signal line 246.

The following elements of the computer system 200 were described above with reference to one or more of FIG. 1A, and so, these descriptions will not be repeated here: the processor 125; the communication unit 145; the DSRC-compliant GPS unit 150; the memory 127; the onboard unit 139; and the sensor set 126.

The clock 221 includes a software, hardware or a combination of hardware and software that is configured to monitor the passage of time.

In some embodiments, the clocks 221 of a plurality of computer systems 200 are synchronized so that they each monitor the passage of time in synchronization with one another. In this way, for any point in time, the clock 221 of a first vehicle 123 and the clock 221 of a Nth vehicle 124 may each indicate the same time or substantially the same time.

In some embodiments, the time recorded by the clock 221 is used to monitor the beginning of a predetermined time frame and measure whether the predetermined time frame has expired. In some embodiments, each wireless beacon which is received by the computer system 200 is time-stamped using the time recorded by the clock 221 so that only those wireless beacons which are received during a current predetermined time frame are used by the fingerprint system 199 to generate the local fingerprint described by the local fingerprint data 181 for the current predetermined time frame.

The storage 241 is a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the fingerprint system 199 includes code and routines that are operable, when executed by the processor 125, to cause the processor 125 to execute one or more steps of the method 300 described below with reference to FIG. 3.

In the illustrated embodiment shown in FIG. 2, the fingerprint system 199 includes a communication module 202, the detector system 197 and the manager system 193.

The communication module 202 can be software including routines for handling communications between the fingerprint system 199 and other components of the computer system 200. In some embodiments, the communication module 202 can be a set of instructions executable by the processor 125 to provide the functionality described below for handling communications between the fingerprint system 199 and other components of the computer system 200. In some embodiments, the communication module 202 can be stored in the memory 127 of the computer system 200 and can be accessible and executable by the processor 125. The communication module 202 is adapted for cooperation and communication with the processor 125 and other components of the computer system 200 via signal line 222. In some embodiments, the communication module 202 is stored in the memory 127 and accessible and executable by the processor 125.

The communication module 202 sends and receives data, via the communication unit 145, to and from one or more elements of the operating environment 100 or the operating environment 101.

In some embodiments, the communication module 202 receives data from components of the fingerprint system 199 and stores the data in one or more of the storage 241 and the memory 127.

In some embodiments, the communication module 202 may handle communications between components of the fingerprint system 199 or the computer system 200.

The detector system 197 is adapted for cooperation and communication with the processor 125 and other components of the computer system 200 via signal line 223. In some embodiments, the detector system 197 is stored in the memory 127 and accessible and executable by the processor 125. The detector system 197 was described above with reference to FIG. 1A, and so, that description will not be repeated here.

The manager system 193 is adapted for cooperation and communication with the processor 125 and other components of the computer system 200 via signal line 224. In some embodiments, the manager system 193 is stored in the memory 127 and accessible and executable by the processor 125. The manager system 193 was described above with reference to FIG. 1A, and so, that description will not be repeated here.

Figure 3:
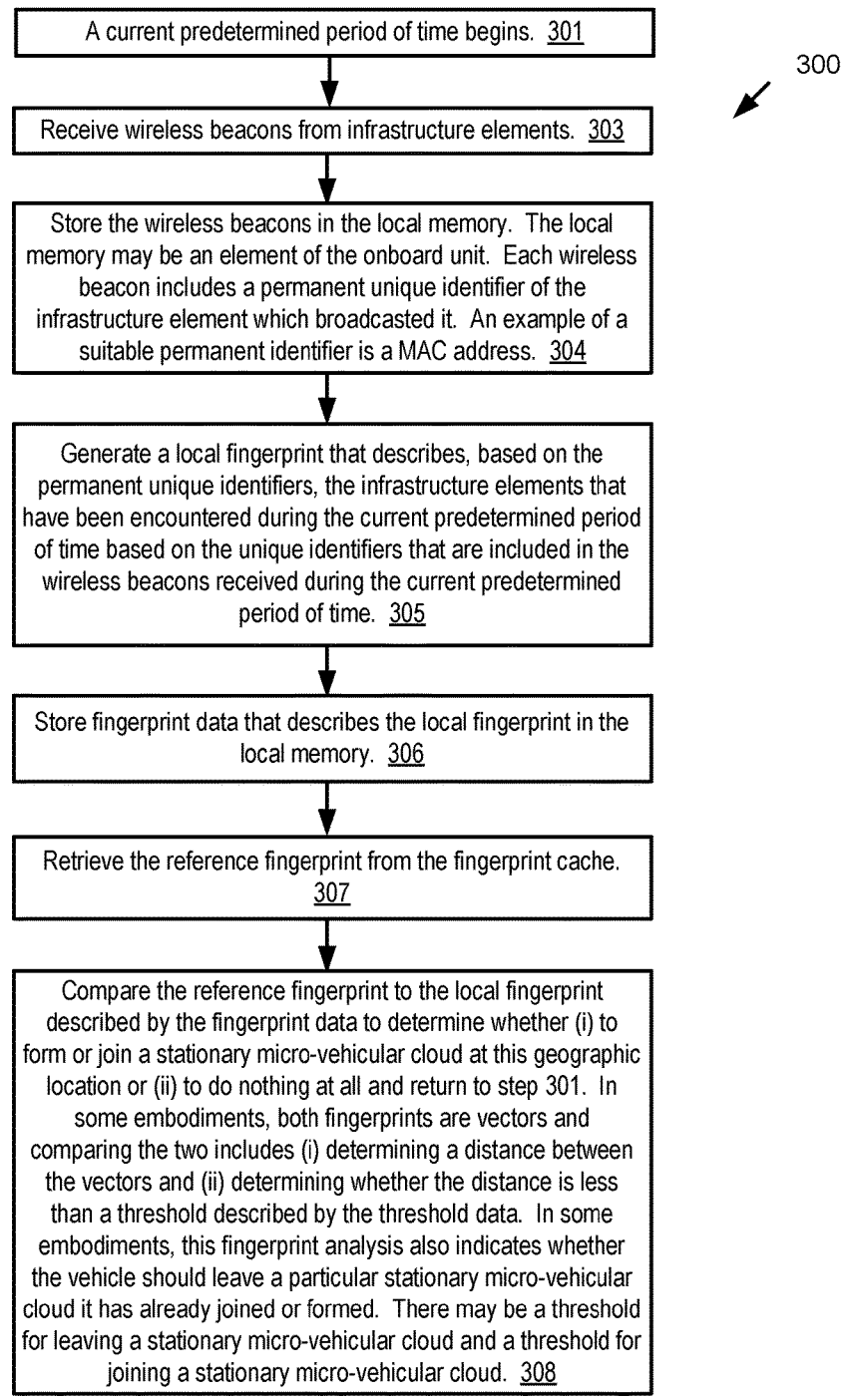
FIG. 3 is a flowchart of an example method for determining whether a vehicle is positioned at a geographic location for a micro-vehicular cloud according to some embodiments.

Referring now to FIG. 3, depicted is a flowchart of an example method 300 for determining whether a vehicle, such as the first vehicle 123 or the Nth vehicle 124, is positioned at a geographic location for a micro-vehicular cloud according to some embodiments. One or more steps of the method 300 may be executed by the computer system 200 described above with reference to FIG. 2.

At step 301, a current predetermined period of time begins.

At step 303, wireless beacons are received from infrastructure elements during the current predetermined period of time.

At step 304, the wireless beacons are stored in a local memory of the connected vehicle. In some embodiments, the local memory is an element of the onboard unit of the vehicle. Each wireless beacon includes a permanent unique identifier of the infrastructure element which broadcasted it. An example of a suitable permanent identifier is a MAC address.

At step 305, a local fingerprint is generated that describes, based on the permanent unique identifiers, the infrastructure elements that have been encountered during the current predetermined period of time based the unique identifiers that are included in the wireless beacons received during the current predetermined period of time.

At step 306, fingerprint data that describes the local fingerprint is stored in the local memory.

At step 307, a reference fingerprint is retrieved from a fingerprint cache.

At step 308, compare the reference fingerprint to the local fingerprint to determine whether (i) to form or join a stationary micro-vehicular cloud at this geographic location or (ii) to do nothing at all and return to step 301. In some embodiments, both fingerprints are vectors and comparing the local fingerprint and the reference fingerprint includes (i) determining a distance between the vectors and (ii) determining whether the distance is less than a threshold described by the threshold data. In some embodiments, this fingerprint analysis also indicates whether the vehicle should leave a particular stationary micro-vehicular cloud it has already joined or formed. In some embodiments, there is a threshold for leaving a stationary micro-vehicular cloud and a threshold for joining a stationary micro-vehicular cloud.

Referring now to FIG. 4A, depicted is a block diagram illustrating an operating environment 400 for a fingerprint system according to some embodiments. The operating environment 400 depicts an example of determining a distance between a local fingerprint, c, and a reference fingerprint, $r_i$, for a plurality of different connected vehicles according to some embodiments.

The operating environment 400 includes the following elements: a first infrastructure element 401; a second infrastructure element 402; a third infrastructure element 403; a fourth infrastructure element 404; a fifth infrastructure element 405; a first connected vehicle V1; a second connected vehicle V2; a third connected vehicle V3; and a stationary micro-vehicular cloud 194. Each of the connected vehicles V1, V2, V3 include a fingerprint system as described herein.

In some embodiments, the connected vehicles V1, V2, V3 (both parked and moving) represent their current context by a vector, called a local fingerprint, $c = \langle c_1, c_2, \ldots, c_n \rangle$.

In some embodiments, elements of a local fingerprint can include one or more of the following variables: binary variables that take one ("1") if the connected vehicle has received a wireless beacon from a certain network infrastructure (e.g., a certain Wi-Fi access point) during the current predetermined time frame, or a zero (0) otherwise; the number of wireless beacons received from each infrastructure element; the signal strength of each wireless beacon received during the predetermined time period; a current geographical position of the connected vehicle; and the historical geographical positions of the connected vehicle as indicated by the GPS data log for the connected vehicle.

In some embodiments, for each predetermined period of time, a fingerprint system of each connected vehicle V1, V2, V3 calculates its own local fingerprint, c, based on the wireless beacon set it has aggregated during the current predetermined period of time.

In some embodiments, a reference fingerprint $r_i = \langle r_{i1}, r_{i2}, \ldots, r_{in} \rangle$ is defined for each micro-vehicular cloud, i.

In some embodiments, a connected vehicle V1, V2, V3 attempts to join the micro-vehicular cloud, i if the "distance" between its own local fingerprint (c) and the reference fingerprint ($r_i$) for the micro-vehicular cloud, $dist(c, r_i)$, is lower than a pre-defined threshold, $\theta_{join}$, which is described by the threshold data.

Each of the connected vehicles V1, V2, V3 include a fingerprint system as described herein, and as such, each includes a detector system and a manager system. In some embodiments, a detector system of each connected vehicle V1, V2, V3 observes wireless beacons from the network infrastructure elements (and, optionally, measurements from the sensors of its onboard sensor set) to update its local fingerprint, c, at regular time intervals. In some embodiments, whenever the local fingerprint is updated, the detector system calculates $dist(c, r_i)$ for each reference fingerprint $r_i$ in its local fingerprint cache. If $dist(c, r_i) < \theta_{join}$, the detector system instructs the manager system to initiate a procedure to join a micro-vehicular cloud, i. If there are multiple micro-vehicular clouds, say cloud 1 and cloud 2, that satisfy $dist(c, r_i) < \theta_{join}$, the vehicle may join both of them, or may select a subset of them by arbitrary criteria (e.g., $argmin_i$ $dist(c, r_i)$, first-in-first-out basis, etc.). In some embodiments, the detector system continues to monitor $dist(c, r_i)$ after joining the vehicle cloud i, and instructs the manager system initiates a procedure to leave the micro-vehicular cloud, i, if $dist(c, r_i)$ exceeds a pre-defined threshold $\theta_{leave}$. It is also possible to define different thresholds (i.e., $\theta_{join}$ and $\theta_{leave}$) for each micro-vehicular cloud. In this case, the threshold values are also distributed by the directory client along with the reference fingerprints.

In some embodiments, the manager system performs coordination with other members of micro-vehicular cloud that a connected vehicle currently belongs to with regards to maintenance of intra-cluster wireless links, control of resource utilization and collaborative task execution.

Each micro-vehicular cloud may have one or more coordinators that coordinate membership, resource and task management of cloud members, etc.

In some embodiments, when the manager system of a connected vehicle V1, V2, V3 is instructed to join or leave a micro-vehicular cloud, the manager system sends a message to a coordinator of that micro-vehicular cloud to update the membership.

In some embodiments, the manager system of a coordinator is instructed to leave the cluster by its detector system, it hands over the coordinator role to another member of the micro-vehicular cloud.

Assume a simple scenario, where only five infrastructure elements are deployed in a target geographic region (e.g., a city). Further assume that a local fingerprint, c, is defined by a vector with five binary variables [i.e., $c = <c_1, c_2, c_3, c_4, c_5>$] where $c_j$ becomes "1" if a connected vehicle V1, V2, V3 has received at least one wireless beacon from an infrastructure element, j, over the most recent one second time period of time, or "0" otherwise. In this example, an operator (e.g., a public authority) defines a stationary micro-vehicular cloud 194 with a reference fingerprint, $r_i = <1, 1, 1, 0, 0>$. A distance function is defined as $dist(c, r_i) = \Sigma_j |c_j - r_{ij}|$. The threshold is defined as $\theta = 1$.

In some embodiments, the connected vehicles V1, V2, V3 periodically observe wireless beacons from neighboring the infrastructure elements 401, 402, 403, 404, 405 and update their local fingerprint, c. Whenever a local fingerprint is updated, the detector system calculates a between the local fingerprint, c, and reference fingerprint, $r_i$. The detector system initiates a procedure to join the micro-vehicular cloud, i, if $dist(c, r_i) < 1$.

In some embodiments, the detector system keeps calculating the distance between c and $r_i$, and initiates a procedure to leave the vehicle cloud if $dist(c, r_i) \geq 1$.

Referring now to FIG. 4B, depicted is a block diagram illustrating local fingerprint data 181 according to some embodiments. The local fingerprint data 181 is digital data that describes an example of a local fingerprint having "n" number of variables where "n" is equal to any positive whole number.

Referring now to FIG. 4C, depicted is a block diagram illustrating reference fingerprint data 481 according to some embodiments.

Referring now to FIG. 5A, depicted is a block diagram illustrating BSM data 595 according to some embodiments. In some embodiments, BSM messages, and the BSM data they contain, are used by the fingerprint system 199 to identify nearby vehicles which are potential members of a micro-vehicular cloud which is formed, joined or left by the connected vehicle that includes the fingerprint system 199.

In some embodiments, one or more vehicles (e.g., the first vehicle, the Nth vehicle, etc.) may transmit a DSRC message. The DSRC message may include one or more of a conventional DSRC message, a DSRC probe, or Basic Safety Message ("BSM message" if singular, or "BSM messages" if plural).

The regular interval for transmitting BSM messages is user configurable. In some implementations, a default setting for this interval is transmitting the BSM message is every 0.10 seconds or substantially every 0.10 seconds. A BSM message is broadcasted over the 5.9 GHz DSRC band. In some embodiments, the DSRC radio of the communication unit includes seven bands for transmitting and receiving DSRC messages, with one of these bands being reserved exclusively for transmitting and receiving BSM messages.

The range for transmitting DSRC messages such as BSM messages is substantially 1,000 meters. In some implementations, DSRC range is a range of substantially 100 meters to substantially 1,000 meters.

Referring now to FIG. 5B, depicted is a block diagram illustrating BSM data 595 according to some embodiments. In some embodiments, each BSM message includes all of the information depicted in FIG. 7B for the BSM data 595 and no other information.

A BSM message may include two parts. These two parts may include different BSM data 595 as shown in FIG. 7B.

Part 1 of the BSM data 595 describes the following: vehicle position; vehicle heading; vehicle speed; vehicle acceleration; vehicle steering wheel angle; and vehicle size.

Part 2 of the BSM data 595 includes a variable set of data elements drawn from a list of optional elements. Some of the BSM data 595 included in Part 2 of the DSRC message are selected based on event triggers, e.g., anti-locking brake system ("ABS") being activated may trigger BSM data 595 relevant to the ABS system of the vehicle.

In some implementations, some of the elements of Part 2 are transmitted less frequently in order to conserve bandwidth.

In some implementations, the BSM data 595 included in a BSM message includes current snapshots (i.e., photographs) of a vehicle traveling along a roadway system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system comprising:
a processor of a connected vehicle communicatively coupled to a communication unit, wherein the processor is operable to execute computer code that causes the processor to:
receive, via the communication unit, a wireless beacon including a unique identifier of an infrastructure element which broadcasted the wireless beacon;
identify, based on the unique identifier, a geographic location for a stationary micro-vehicular cloud;
generate a local fingerprint that describes the unique identifier of the infrastructure element encountered by the connected vehicle during a predetermined time frame;
compare the local fingerprint to a reference fingerprint for the predetermined time frame; and
responsive to determining that the connected vehicle is presently at the geographic location for the stationary micro-vehicular cloud based on the comparison, participate in the stationary micro-vehicular cloud.

2. The system of claim 1, wherein the infrastructure element is an open wireless access point.

3. The system of claim 1, wherein the infrastructure element is included in a server.

4. The system of claim 3, wherein the server is included in a roadside unit.

5. The system of claim 1, wherein comparing the local fingerprint to the reference fingerprint includes determining that the predetermined time frame is within a threshold of similarity of the reference fingerprint and wherein the predetermined time frame is a most recent time frame.

6. The system of claim 1, wherein participating in the stationary micro-vehicular cloud includes one or more of: forming the stationary micro-vehicular cloud; joining the stationary micro-vehicular cloud; and leaving the stationary micro-vehicular cloud.

7. The system of claim 1, wherein the comparison indicates that the connected vehicle is positioned at the geographic location for the stationary micro-vehicular cloud.

8. The system of claim 1, wherein the reference fingerprint describes one or more unique identifiers of one or more infrastructure elements which are known to be located at the geographic location for the stationary micro-vehicular cloud.

9. A method comprising:
receiving, by an onboard unit of a connected vehicle, a wireless beacon including a unique identifier of an infrastructure element which broadcasted the wireless beacon;
identifying, based on the unique identifier, a geographic location for a stationary micro-vehicular cloud;
generating a local fingerprint that describes the unique identifier of the infrastructure element encountered by the connected vehicle during a predetermined time frame;
comparing the local fingerprint to a reference fingerprint for the predetermined time frame; and
responsive to determining that the connected vehicle is presently at the geographic location for the stationary micro-vehicular cloud based on the comparison, participating in the stationary micro-vehicular cloud.

10. The method of claim 9, wherein the infrastructure element is an open wireless access point.

11. The method of claim 9, wherein the infrastructure element is included in a server.

12. The method of claim 11, wherein the server is included in a roadside unit.

13. The method of claim 9, wherein comparing the local fingerprint to the reference fingerprint includes determining that the predetermined time frame is within a threshold of similarity of the reference fingerprint and wherein the predetermined time frame is a most recent time frame.

14. The method of claim 9, wherein participating in the stationary micro-vehicular cloud includes one or more of: forming the stationary micro-vehicular cloud; joining the stationary micro-vehicular cloud; and leaving the stationary micro-vehicular cloud.

15. The method of claim 9, wherein the comparison indicates that the connected vehicle is positioned at the geographic location for the stationary micro-vehicular cloud.

16. The method of claim 9, wherein the reference fingerprint describes one or more unique identifiers of one or more infrastructure elements which are known to be located at the geographic location for the stationary micro-vehicular cloud.

17. A computer program product of a connected vehicle comprising a non-transitory memory storing computer-executable code that, when executed by a processor of the connected vehicle, causes the processor to:
receive a wireless beacon including a unique identifier of an infrastructure element which broadcasted the wireless beacon;
identify, based on the unique identifier, a geographic location for a stationary micro-vehicular cloud;
generate a local fingerprint that describes the unique identifier of the infrastructure element encountered by the connected vehicle during a predetermined time frame;
compare the local fingerprint to a reference fingerprint for the predetermined time frame; and
responsive to determining that the connected vehicle is presently at the geographic location for the stationary micro-vehicular cloud based on the comparison, participate in the stationary micro-vehicular cloud.

18. The computer program product of claim 17, wherein comparing the local fingerprint to the reference fingerprint includes determining that the predetermined time frame is within a threshold of similarity of the reference fingerprint and wherein the predetermined time frame is a most recent time frame.

19. The computer program product of claim 17, wherein the comparison indicates that the connected vehicle is positioned at the geographic location for the stationary micro-vehicular cloud.

20. The computer program product of claim 17, wherein the reference fingerprint describes one or more unique identifiers of one or more infrastructure elements which are known to be located at the geographic location for the stationary micro-vehicular cloud.

* * * * *